US008976222B2

(12) United States Patent
Kawamura et al.

(10) Patent No.: US 8,976,222 B2
(45) Date of Patent: Mar. 10, 2015

(54) IMAGE PROCESSING APPARATUS AND IMAGE PROCESSING METHOD

(71) Applicants: Yohsuke Kawamura, Kanagawa (JP); Kohji Oshikiri, Kanagawa (JP)

(72) Inventors: Yohsuke Kawamura, Kanagawa (JP); Kohji Oshikiri, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 143 days.

(21) Appl. No.: 13/716,776

(22) Filed: Dec. 17, 2012

(65) Prior Publication Data

US 2013/0162757 A1 Jun. 27, 2013

(30) Foreign Application Priority Data

Dec. 27, 2011 (JP) .................................. 2011-286611

(51) Int. Cl.
*H04N 7/14* (2006.01)
(52) U.S. Cl.
CPC ............... *H04N 7/147* (2013.01); *H04N 7/142* (2013.01)
USPC ............... 348/14.08; 348/231.6; 348/231.99; 348/246; 348/448; 358/1.13; 358/1.16; 358/1.2; 358/474; 358/536; 382/132; 382/162; 382/182; 382/232; 382/260; 600/443
(58) Field of Classification Search
CPC . H04N 1/32358; H04N 1/40; H04N 19/0009; G06T 1/60
USPC .............. 348/14.08, 231.6, 231.99, 246, 448; 358/1.13, 1.16, 474, 536; 382/132, 382/162, 182, 232, 260, 286; 600/443
See application file for complete search history.

(56) References Cited

U.S. PATENT DOCUMENTS

| 5,418,896 | A | * | 5/1995 | Kumamoto et al. | 382/286 |
|---|---|---|---|---|---|
| 5,687,296 | A | * | 11/1997 | Shimada | 358/1.2 |
| 5,946,411 | A | * | 8/1999 | Yamaguchi | 382/162 |
| 6,480,231 | B1 | * | 11/2002 | Bernstein et al. | 348/448 |
| 6,529,618 | B1 | * | 3/2003 | Ohara et al. | 382/132 |
| 6,950,559 | B2 | * | 9/2005 | Kobayashi | 382/260 |
| 7,016,086 | B2 | * | 3/2006 | Honda | 358/474 |
| 7,404,797 | B2 | * | 7/2008 | Azuma et al. | 600/443 |
| 7,483,164 | B2 | * | 1/2009 | Nakazono et al. | 358/1.16 |

(Continued)

FOREIGN PATENT DOCUMENTS

JP 2010-134743 6/2010

OTHER PUBLICATIONS

U.S. Appl. No. 13/530,869, filed Jun. 22, 2012, Toshio Akiyama.

*Primary Examiner* — Gerald Gauthier
(74) *Attorney, Agent, or Firm* — Harness, Dickey & Pierce, P.L.C.

(57) ABSTRACT

An image processing apparatus includes an image processing command input section to receive image processing commands for image data written into a memory by units of one line, a line number deriving section to derive a number of lines of the image data required to execute image processing operations based on the image processing commands received by the image processing command input section, a line number indicating section to output a numerical value indicating the number of lines of the image data derived by the line number deriving section, a read timing controlling section to control read timing from the memory in response to the numerical value output from the line number indicating section, a parameter indicating section to output parameters used for the image processing operations, and an image processing section to execute the image processing operations.

9 Claims, 11 Drawing Sheets

(56) References Cited

U.S. PATENT DOCUMENTS

| | | | |
|---|---|---|---|
| 7,916,191 B2* | 3/2011 | Kiba et al. | 348/246 |
| 7,999,980 B2* | 8/2011 | Komatsu | 358/536 |
| 8,274,668 B2* | 9/2012 | Nakayama et al. | 358/1.13 |
| 8,369,632 B2* | 2/2013 | Ueno et al. | 382/232 |
| 8,537,244 B2* | 9/2013 | Taoka | 348/231.6 |
| 2009/0220154 A1* | 9/2009 | Daidoh | 382/182 |
| 2012/0105679 A1* | 5/2012 | Osuga et al. | 348/231.99 |
| 2013/0162757 A1* | 6/2013 | Kawamura et al. | 348/14.08 |

* cited by examiner

FIG.6

| TYPE OF IMAGE PROCESSING | PARAMETERS | |
|---|---|---|
| | EXECUTE OR NOT | SET VALUE |
| ROTATION | OFF | 0-DEGREE |
| DISTORTION CORRECTION | ON | 100% |
| TILT CORRECTION | OFF | (0,0),(1600,0),(0,1200),(1600,1200) |
| WHITE BALANCE ADJUSTMENT | ON | AUTO |
| ZOOM | OFF | 150% |
| ... | ... | ... |

FIG.7

| TYPE OF IMAGE PROCESSING | REQUIRED NUMBER OF LINES |
|---|---|
| ROTATION | 1 |
| DISTORTION CORRECTION | 200 |
| TILT CORRECTION | 1 |
| WHITE BALANCE ADJUSTMENT | 1 |
| ... | ... |
| A THRESHOLD VALUE OF THE NUMBER OF LINES | 200 |

FIG.8

| PARAMETERS | REQUIRED NUMBER OF LINES |
|---|---:|
| OFF | 1 |
| 1% TO 20% | 40 |
| 21% TO 40% | 80 |
| 41% TO 60% | 120 |
| 61% TO 80% | 160 |
| 81% TO 100% | 200 |

IMAGE PROCESSING APPARATUS AND IMAGE PROCESSING METHOD

BACKGROUND OF THE INVENTION

1. Field of the Invention

The disclosures herein generally relate to an image processing apparatus and an image processing method.

2. Description of the Related Art

In recent years, video-conferences between remote locations have become popular in which images and sound are distributed from a terminal to other remote terminals via networks such as the Internet. A terminal used in a video-conference may be provided with a video camera or a mike through which visual or audio data can be captured and transmitted to other terminals at remote locations via networks, which makes it possible to hold a conference between remote locations.

In general, an amount of image data used for moving pictures is large. Moreover, high-quality picture technologies developed in recent years increase workload for image processing operations at terminal devices, which incurs an increased amount of processing time of the image data, sometimes appearing as an increased delay of transmission of the image data.

Examples of image processing operations done at a terminal may include image rotation, cut-out of a designated area, tilt correction, magnification, distortion correction, white balance adjustment, brightness adjustment, etc.

A required amount of data used for an image processing operation and the size of required memory for the data vary from operation to operation. For example, rotation, cut-out, tilt correction, or magnification needs a frame buffer to process a frame of image data at one time. Distortion correction requires a line buffer to process a chunk of several lines of data at one time. White balance adjustment or brightness adjustment does not need a buffer because these operations can be done with sequential processing. To cope with several types of image processing operations, an image processing apparatus provides a frame buffer to fit the largest required amount of data.

An image processing apparatus having a frame buffer executes image processing operations frame by frame. A frame of data is processed after the frame buffer has been filled with lines captured by an imaging device one line at a time. Waiting for the completion of the filling of the frame buffer may result in an increased delay of transmission of the image data. In other words, I/O operations for memory, or the frame buffer, may form a bottleneck of image processing operations.

Japanese Laid-open Patent Publication No. 2010-134743, for example, discloses details.

Conventional image processing apparatuses mentioned above, however, suffer from delays caused by memory write operations to fill one frame with image data, regardless of types of image processing operations.

SUMMARY OF THE INVENTION

It is a general object of at least one embodiment of the present invention to provide an image processing apparatus that substantially obviates one or more problems caused by the limitations and disadvantages of the related art. Specifically, it may be desirable to provide an image processing apparatus that relieves the bottleneck of image processing operations caused by I/O operations for memory.

According to an embodiment, an image processing apparatus has an image processing command input section to receive, as input, one or more image processing commands for image data written into memory by units of one line,
a line number deriving section to derive a number of lines of the image data required to execute image processing operations based on the image processing commands received by the image processing command input section,
a line number indicating section to output a numerical value indicating the number of lines of the image data derived by the line number deriving section,
a read timing controlling section to control read timing from the memory in response to the numerical value output from the line number indicating section,
a parameter indicating section to output parameters used for the image processing operations based on the image processing commands received by the image processing command input section, and
an image processing section to execute the image processing operations in response to the parameters output from the parameter indicating section.

According to at least one embodiment, an image processing apparatus is provided in which the bottleneck caused by I/O operations for memory can be relieved. The bottleneck can be relieved because read timings of image data can be set by units of variable number of lines depending on characteristics of image processing operations.

BRIEF DESCRIPTION OF THE DRAWINGS

Other objects and further features of embodiments will be apparent from the following detailed description when read in conjunction with the accompanying drawings, in which:

FIG. 6 is an example of a table of image conversion parameters;
FIG. 7 is an example of a table of line numbers.
FIG. 8 is an example of a table of line numbers for distortion correction.

DESCRIPTION OF THE PREFERRED EMBODIMENTS

In the following, embodiments of the present invention will be described with reference to the accompanying drawings.

First Embodiment

Figure 1:
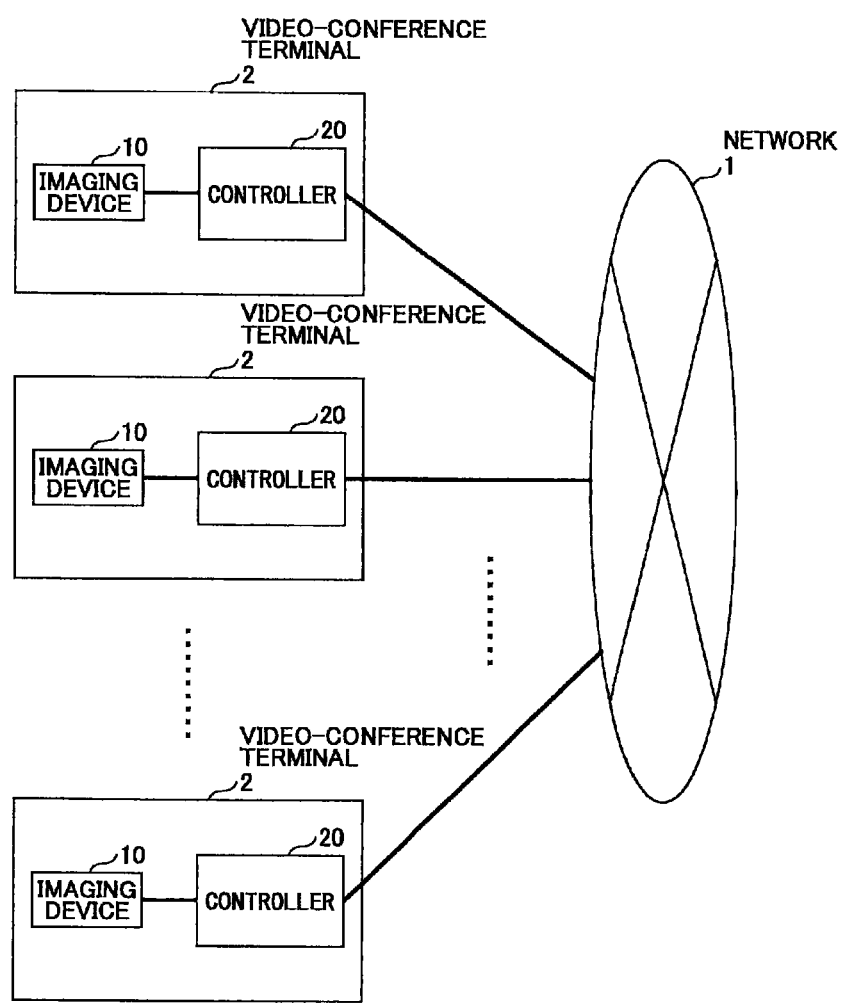
FIG. 1 is an overall view of a video-conference system.

FIG. 1 is an overall view of a video-conference system, which will be explained as an example of an image processing apparatus. In FIG. 1, a network 1 connects multiple video-conference terminals 2. A video-conference terminal 2 provides an imaging device 10 and a controller 20. In addition, the video-conference terminal 2 provides a mike, a loud speaker, and a display connected to the controller 20, which are not illustrated in FIG. 1.

An image processing operation is applied to an image taken by the imaging device 10. The image processing operation is done by cooperation of the imaging device 10 and the controller 20 in the video-conference terminal 2. The processed image is displayed on the display in the video-conference terminal 2. The processed image is also transmitted to other video-conference terminals 2 connected to the network 1, and is displayed on the displays of the other video-conference terminals 2.

When a user pushes a button for zoom in, zoom out, or image rotation (buttons are not illustrated here) at the video-conference terminal 2, the imaging device 10 and the controller 20 in the video-conference terminal 2 cooperatively apply a digital zooming or rotation operation to the image. The processed image is displayed on the display of the video-conference terminal 2. The processed image is also transmitted to the other video-conference terminals 2 connected to the network 1, and is displayed on displays of the other video-conference terminals 2.

According to the video-conference system, it is possible to transmit images processed through tilt correction, digital zooming, or other image processing operations with sound data, and to display the images in real time at multiple video-conference terminals 2.

Figure 2:
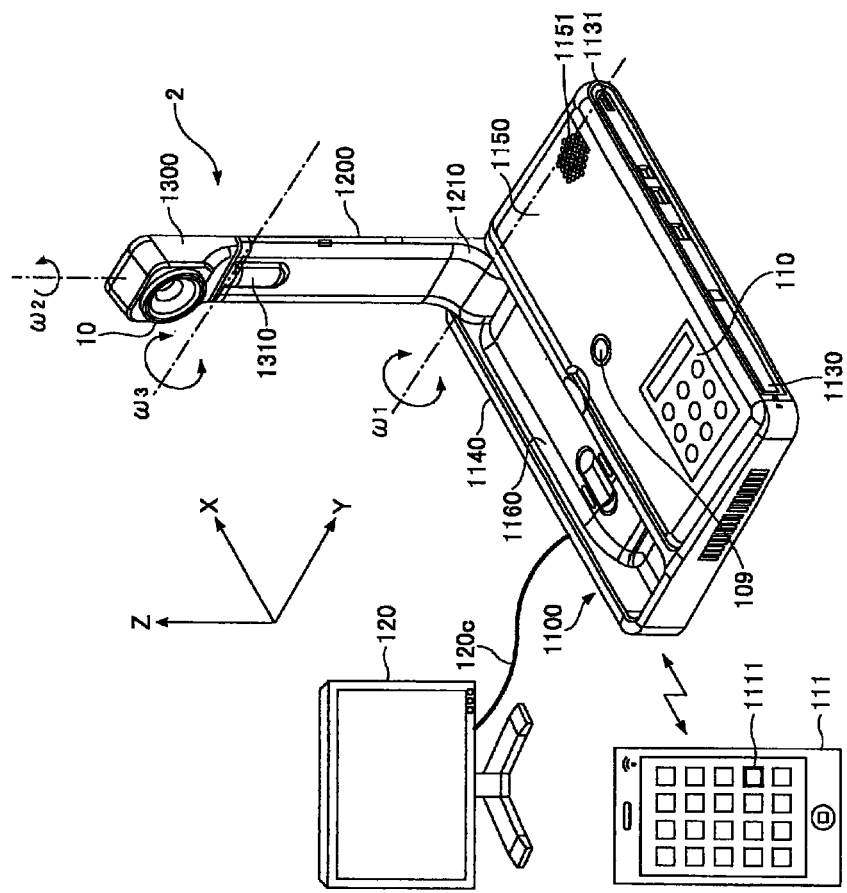
FIG. 2 is an external view of an image processing apparatus.

FIG. 2 is an external view of the video-conference terminal 2 introduced in FIG. 1. It is assumed in the following explanation that x-axis is the longitudinal direction of the video-conference terminal 2, y-axis or width direction is the direction perpendicular to the x-axis in the horizontal plane, and z-axis or vertical direction is the direction perpendicular to the x-axis and the y-axis.

The video-conference terminal 2 provides a chassis 1100, an arm 1200, and a camera housing 1300. A right side surface 1130 of the chassis 1100 has a sound pickup hole 1131. Sound from outside may pass through the sound pickup hole 1131, and reach a sound input section provided in the chassis 1100.

On a top surface 1150, a power switch 109, an operation displaying panel 110, and a sound output hole 1151 are provided. When a user turns on the power switch 109, the video-conference terminal 2 will start up. The user may issue commands on the operation displaying panel 110, such as commands for zoom operations, 90-degree or 180-degree rotation operations, or white balance adjustment of images.

Sound from a sound output section passes through the sound output hole 1151 and reaches outside. On a left side surface 1140 of the chassis 1100, a concave shaped housing section 1160 is provided to hold the arm 1200 and the camera housing 1300. A socket connection (not illustrated here) is also provided on the left side surface 1140 of the chassis 1100. The socket connection has a cable 120c plugged in to connect an image output section 24 (see FIG. 2) and a display device 120.

The arm 1200 is attached to the chassis 1100 with a torque hinge 1210. It is configured in such a way that the arm 1200 can rotate vertically up to 135 degrees of tilt angle $\omega 1$ relative to the chassis 1100. In FIG. 2, the tilt angle $\omega 1$ is set at 90 degrees. By setting the tilt angle $\omega 1$ at 0 degrees, the arm 1200 and the camera housing 1300 can be held in the housing section 1160.

The camera housing 1300 has the imaging device 10 built-in. The imaging device 10 can take a picture of a person, for example, a participant of a video-conference, characters or symbols on paper, or the room. The camera housing 1300 also has a torque hinge 1310. The camera housing 1300 is attached to the arm 1200 with the torque hinge 1310. It is configured in such a way that the camera housing 1300 can rotate vertically up to ±180 degrees of pan angle $\omega 2$, or horizontally up to ±45 degrees of tilt angle $\omega 3$ relative to the current angles formed in FIG. 2 by the camera housing 1300 and the arm 1200.

The user may give various settings for image zooming, rotation, or tilt correction though the operation displaying panel 110, while displaying an image taken by the imaging device on the display device 120.

It is noted that the video-conference terminal 2 in the present embodiment may be different from the one in FIG. 2, or other configurations may be adopted. For example, the video-conference terminal 2 may be a personal computer with a sound output section or a sound input section attached externally. A mobile terminal such as a smart phone may be used as a video-conference terminal instead of the one in the present embodiment. The imaging device 10 may be attached to the video-conference terminal 2 or separated from it. The operation displaying panel 110 also may be attached to a main unit of the video-conference terminal 2, or separated from it as a remote control device. Moreover, when using a mobile terminal 111 as an operation displaying panel, the functionality of the operation displaying panel may be implemented with an application 1111 through wireless communication.

Figure 3:
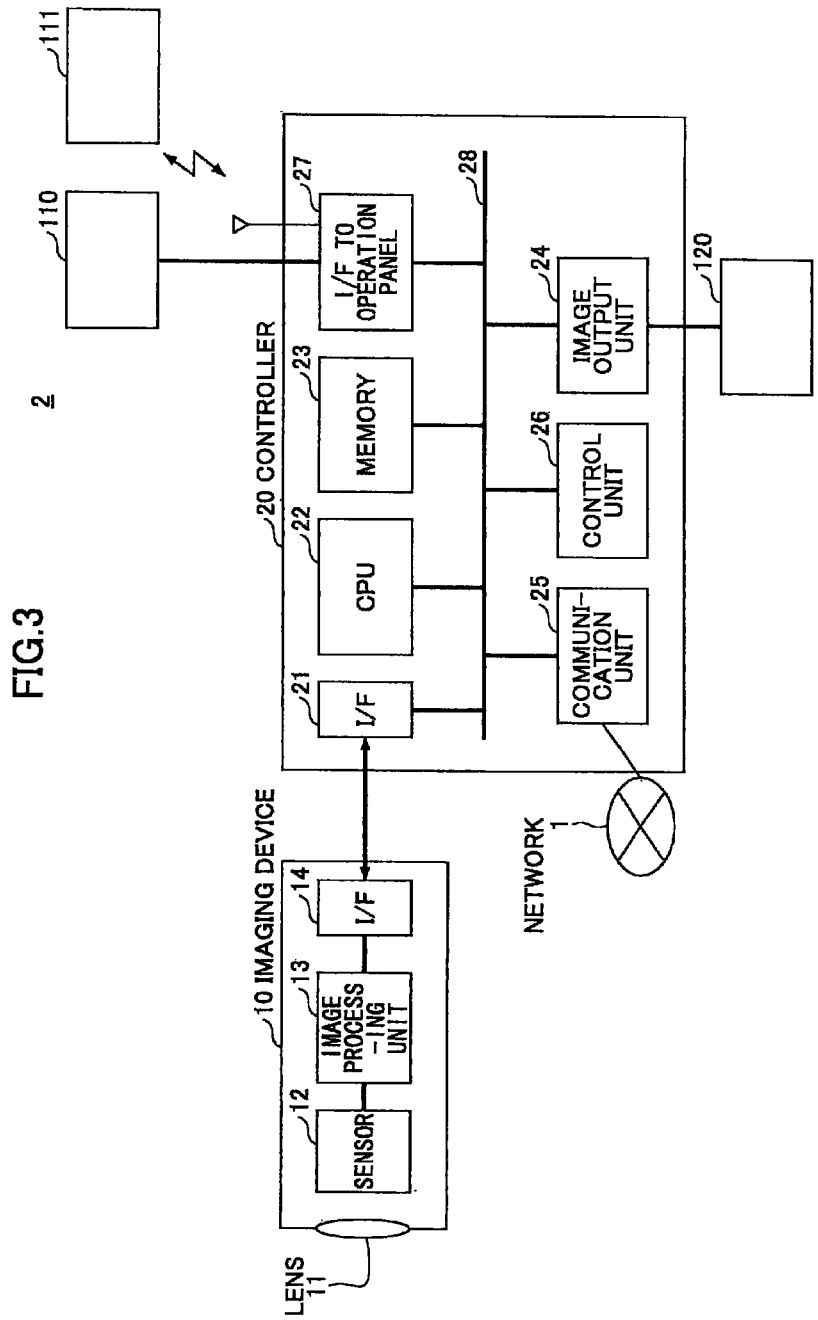
FIG. 3 is an overall configuration diagram of an image processing apparatus.

FIG. 3 is an overall configuration diagram of the image processing apparatus. The image processing apparatus in FIG. 3 provides the imaging device 10 and the controller 20. A personal computer, for example, may be used as the controller 20. The imaging device 10 and the controller 20 are connected to each other with a wireless or wired connection such as a USB interface.

The imaging device 10 provides a lens 11, a sensor 12 using CCD, CMOS, or the like to convert an optical image generated by the lens 11 into a frame image of electric signals, an image processing unit 13 which is an image signal processor (ISP) for applying various image processing operations to images taken from the sensor 12, and an interface (I/F) unit 14 which sends/receives frame images, converted frame images, other data, or control signals to/from the controller 20.

The controller 20 provides an interface (I/F) unit 21 which sends/receives image data, converted image data, other data, or control signals to/from imaging device 10, a CPU 22 for various processing, a memory 23 for storing various software, data, frame images, converted frame images, etc., an image output unit 24 for sending image signals to the display 120, a communication unit 25 for sending image data, etc., to other devices connected to networks, a control unit 26 for controlling the controller 20 as a whole, an interface section to operation panel 27 connected to the operation displaying panel 110 or 111, and a bus 28 to connect the units above. It is noted that the term "memory" is used as a generic term for a device having a storing function, such as RAM, ROM, and HDD.

Figure 4:
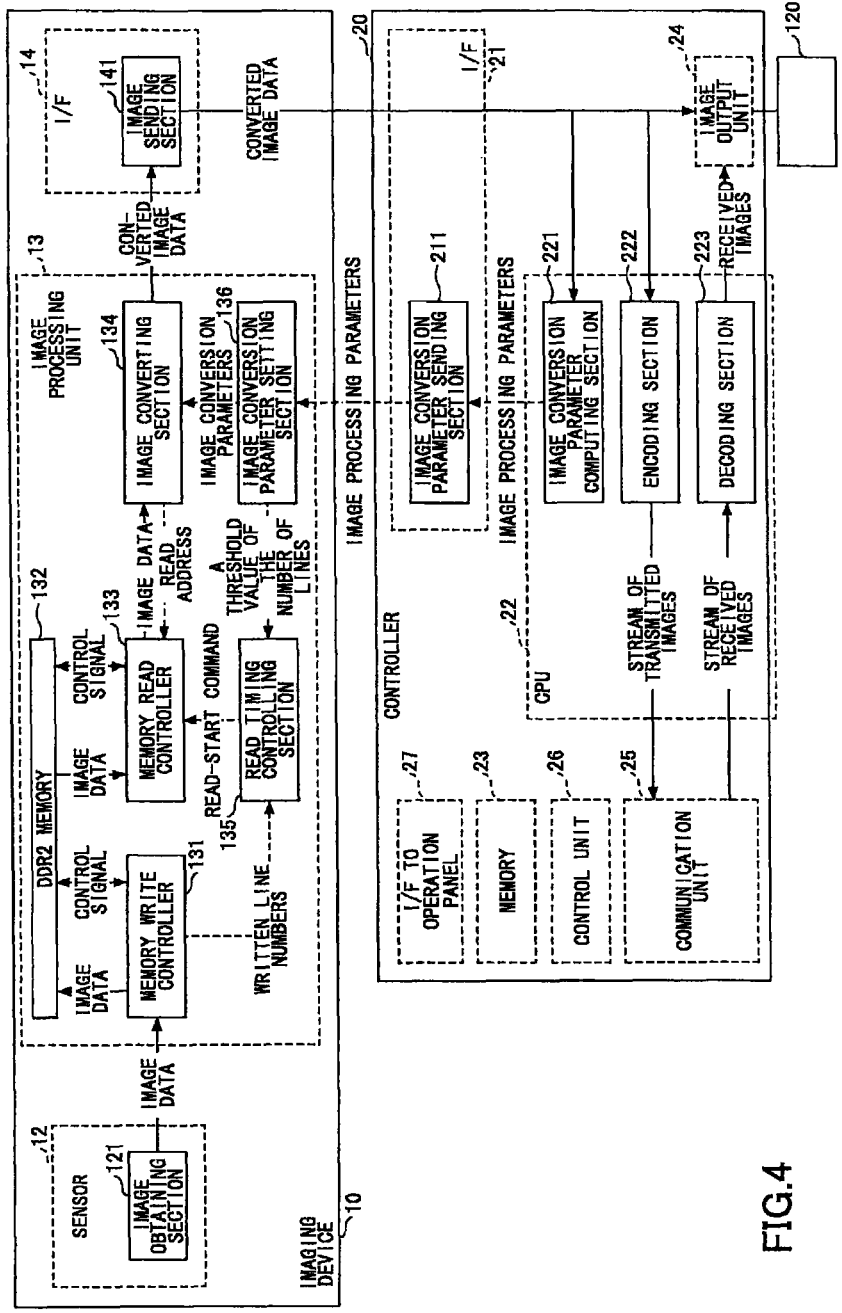
FIG. 4 is a detailed configuration diagram of an image processing apparatus.

FIG. 4 is a detailed configuration diagram of the image processing apparatus. Parts explained with FIG. 3 will be skipped in the following explanation.

In FIG. 4, the sensor 12 has an image obtaining section 121. The image processing unit 13 has a memory write controller 131, a DDR2 memory 132, a memory read controller 133, an image converting section 134, a read timing controlling section 135, and an image conversion parameter setting section 136. The interface unit 14 has an image sending section 141. The interface unit 21 has an image conversion parameter sending section 211. The CPU 22 has an image conversion parameter computing section 221, an encoding section 222, and a decoding section 223.

It is noted that each of the memory write controller 131, the memory read controller 133, the image converting section 134, the read timing controlling section 135, and the image conversion parameter setting section 136 represents a function block whose functionality may be implemented by special hardware. A function block also may be implemented by software or middleware in memory. Therefore, these function blocks should not be considered to be restricted to their implementations presented here.

The sensor 12 has an image obtaining section 121 to generate image data. An image taken by the imaging device 10 is sent to the memory write controller 131 as a line of data in chronological order according to an image taking period. Although the generated data structure of image data may vary from imaging device to imaging device, it is common that memory writing is done by units of lines.

The memory write controller 131 writes the image data to the DDR2 memory 132, and indicates the number of lines to the read timing controlling section 135.

The image conversion parameter setting section 136 indicates image conversion parameters for the image processing operations directed by the controller 20 to the image converting section 134. The image conversion parameter setting section 136 also derives the number of lines required for the image conversion directed by the controller 20. Then, the image conversion parameter setting section 136 indicates the derived result to the read timing controlling section 135 as a threshold value of the number of lines. The details will be described later.

Based on the image conversion parameters, the image converting section 134 indicates the read address of the image data to the memory read controller 133, receives the image data, executes the image conversion, and outputs the converted image data to the image sending section 141. As described before, some of the image processing operations considered here may be done by units of a frame such as, for example, rotation, cut-out of a designated area, tilt correction, or magnification. The other image processing operations may be done by units of several lines such as distortion correction, or done with sequential processing such as white balance adjustment, brightness adjustment, etc. The image converting section 134 executes various image processing operations based on contents of image conversion parameters taken from the image conversion parameter setting section 13.

The read timing controlling section 135 issues a read-start command to the memory read controller 133, when the number of lines already written, which is indicated by the memory write controller 131, becomes greater than the threshold value of the number of lines indicated by the image conversion parameter setting section 136.

When receiving the read-start command, the memory read controller 133 reads the image data from the specified read address in the DDR2 memory 132, and sends the image data to the image converting section 134. The image sending section 141 sends the converted image data to the controller 20.

In the imaging device 10 exemplified in FIG. 4, a piece of image data generated by a single image obtaining section 121 is written to a single memory device 132. It is noted that multiple sensors may simultaneously write data to multiple memory devices. For example, three sensors may write to three memory devices. Also, write/read may be done with multiple lines at a time, as long as the number of lines is counted accordingly.

An image processing command, which is received at the operation displaying panel 110 or 111 explained with FIG. 2 and FIG. 3, comes to the controller 20 through the interface section to operation panel 27. The command is converted to image processing parameters for a later image processing operation by the image conversion parameter computing section 221. The parameters are transmitted to the image conversion parameter setting section 136 through the image conversion parameter sending section 211. The image processed in the imaging device 10 is encoded in the encoding section 222 to be transmitted to other image processing apparatus through the communication unit 25. At the same time, the image is displayed on the display 120 through the image output unit 24. Also, an image transmitted from another image processing apparatus through the communication unit 25 is decoded by the decoding section 223. The image is displayed on the display 120 through the image output unit 24.

Figure 5:
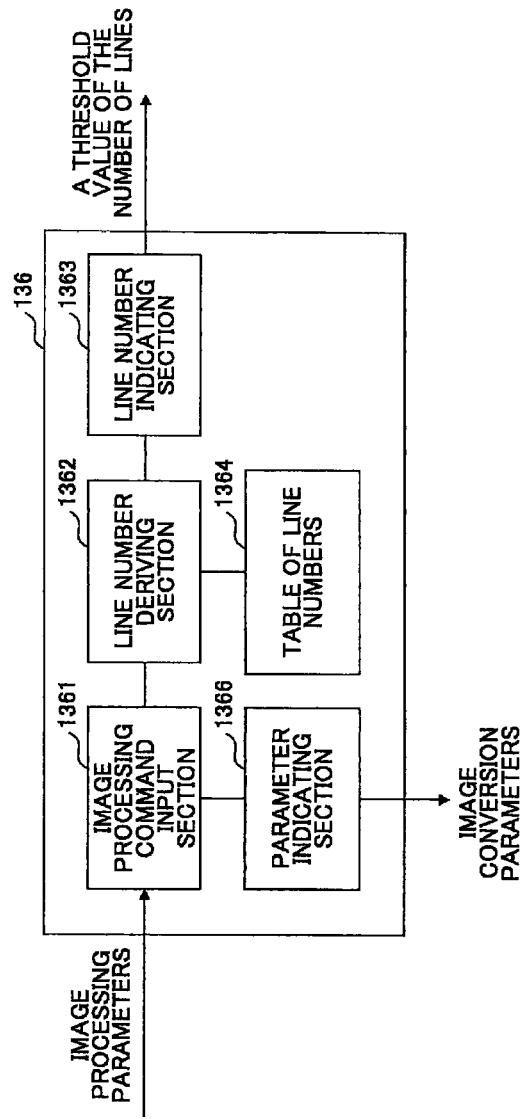
FIG. 5 is a configuration diagram of an image conversion parameter setting section according to a first embodiment.

FIG. 5 is a configuration diagram of the image conversion parameter setting section 136 in the present embodiment. In FIG. 5, the image conversion parameter setting section 136 has an image processing command input section 1361, a line number deriving section 1362, a line number indicating section 1363, a table of line numbers 1364, and a parameter indicating section 1366.

The image processing parameters inputted from the controller 20 are received as input to the image processing command input section 1361 in the image conversion parameter setting section 136. Then, the parameters are also received by the line number deriving section 1362 and the parameter indicating section 1366. The parameter indicating section 1366 generates image conversion parameters based on the image processing parameters. The generated parameters are outputted to the image converting section 134 shown in FIG. 4. The image converting section 134 executes image processing operations according to the image processing parameters. In the present embodiment, the parameter indicating section 1366 is explained as a part of the image conversion parameter setting section 136. It is noted that the parameter indicating section 1366 may be separated from the image conversion parameter setting section 136, as long as it indicates parameters to the image converting section 134 as an execution section for image processing operations.

The line number deriving section 1362 analyzes the image processing parameters received as input. The image processing parameters include one or more image processing directions. For each direction of the image processing operations, the line number deriving section 1362 refers to the table of line numbers 1364, and derives the number of required lines. The derived number of lines is indicated to the read timing controlling section 135 explained in FIG. 4 as the threshold value of the number of lines through the line number indicating section 1363.

Examples of the table of line numbers 1364 will be explained here with FIG. 6, FIG. 7, and FIG. 8. Derivation of the number of required lines will be explained.

FIG. 6 is an example of image conversion parameters to be preserved in the table of line numbers 1364 based on image processing parameters directed from the controller 20. FIG. 7 is an example illustrating the required number of lines preserved in the table of line numbers 1364. The required number of lines depends on types of image processing operations.

Image processing parameters directed by the controller 20 include types of image processing operations and corresponding parameters to the contents, as shown in FIG. 6.

When the column labeled "EXECUTE OR NOT" in FIG. 6 is set to "ON", the image processing operation is executed with parameters set in the column labeled "SET VALUE". In case of "OFF", the contents in the column "SET VALUE" are neglected and the image processing operation is not executed.

"ON" and "OFF" can be switched by a command for changing image conversion parameters, which will be described later.

Among one or more types of image processing operations in this table, "ON" is set for distortion correction and white balance adjustment in the "EXECUTE OR NOT" column, which means these types of image processing operations should be executed when directed. From the table in FIG. 7, the number of required lines for distortion correction is 200, and the number of required lines for white balance adjustment is 1. The line number deriving section may derive, for example, the largest value among the numbers which correspond to the types of image processing operations. In this case, the largest number of lines, 200, is indicated to the read timing controlling section 135 illustrated with FIG. 4. At the timing when 200 lines of the image data have been written to the DDR2 memory 132, the 200 lines of the image data are read by the memory read controller 133. The image is processed in the image converting section 134 according to the parameter in "SET VALUE". In this way, for example, an image processing apparatus capable of executing image processing operations by units of a frame may execute image processing operations by units of data smaller than a frame. When executing the image processing operations that can be done by units of data smaller than a frame, the image data can be read without waiting for one entire frame of write operations to the DDR2 memory 132. Thus, it is possible to reduce delay caused by I/O operations for memory.

It is noted that the tables of parameters and line numbers shown in FIG. 6 and FIG. 7, respectively, may be preserved in the image conversion parameter section whose contents may be reused to control memory reads until the contents are rewritten. Or the tables of parameters and line numbers can be rewritten each time a new command of image processing arrives to control memory. Also, parameters do not need to be stored in table format; any data formats that can store the number of required lines for various types of operations are permissible.

As an example of directed image processing operations, FIG. 8 illustrates an example of a table of line numbers for distortion correction. The table is accessed during the operation of distortion correction when the number of required lines is needed. Compared to the number of required lines in FIG. 7, in which one fixed value is assigned to a type of image processing operations, variable numbers of required lines are exemplified in FIG. 8, in which numbers of required lines vary according to contents of parameters. For example, in a case where the number of required image lines varies with the degree of correction ranging from 0% to 100% as is the case of the distortion correction, the optimal timing may be achieved by changing the memory read timing of image data according to the parameters.

It is noted that although the largest number of required lines among multiple image processing operations is chosen in the above example, it is possible to choose another number of required lines depending on a network environment or workload of a system. A certain amount of delay may be allowed to cope with other factors in a system.

Figure 9:
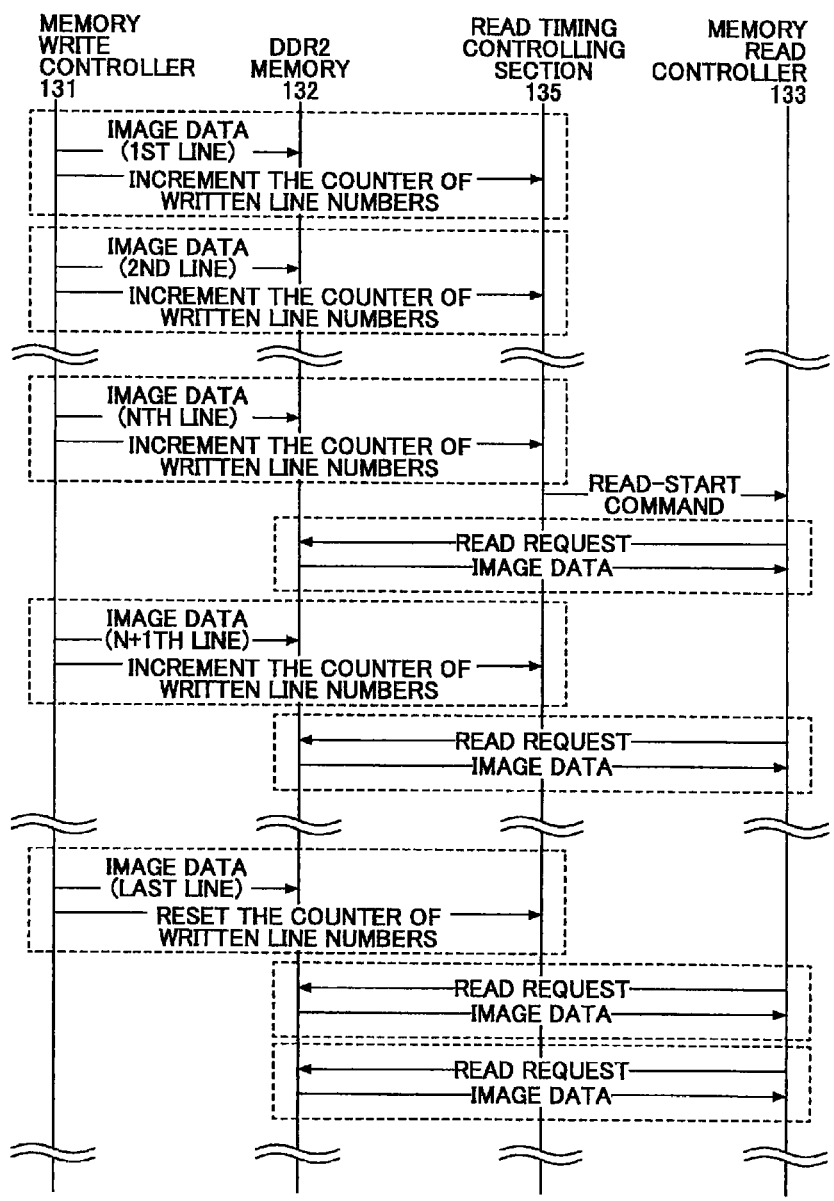
FIG. 9 is a sequence chart illustrating memory write/read timing.

FIG. 9 is a sequence chart illustrating memory write/read timings. With FIG. 9, a case will be explained in which the read timing controlling section 135 is specified to use a threshold value of the number of lines, "n", set by the image conversion parameter setting section 136. After the memory write controller 131 writes one line of the image data into the DDR2 memory 132, the memory write controller 131 indicates to the read timing controlling section 135 that the line has been written. The read timing controlling section 135 counts the number of lines already written with an internal counter for the number of lines already written to the DDR2 memory 132. When the count value reaches to the specified "n", the read timing controlling section 135 issues a read-start command to the memory read controller 133 to start to read the image data from the DDR2 memory 132. The memory write controller 131 issues a command to reset the counter for the number of lines already written to the DDR2 memory 132 when the last line of the image data has been written. The value of "n" depends on types of image processing operations. Shortened delay of memory read may be achieved according to the types of image processing operations.

The sequence allows an accurate read timing even if the next write is being executed at timing when the read of the image data from the DDR2 memory 132 has not been completed.

Figure 10:
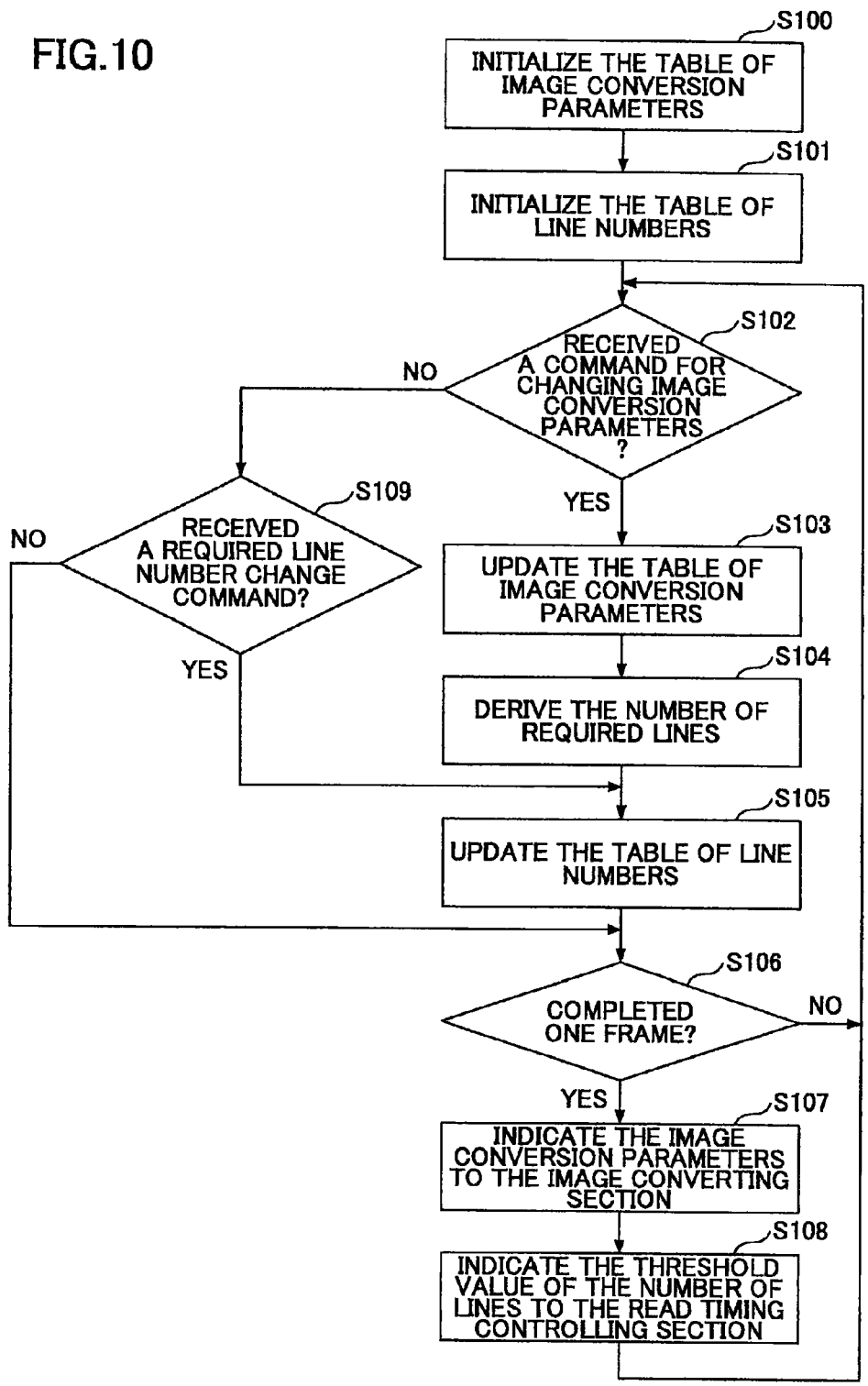
FIG. 10 is a flowchart illustrating a procedure for updating a table of line numbers.

FIG. 10 is a flowchart illustrating an update method for the table of image conversion parameters and the table of line numbers in the image conversion parameter setting section 136 explained with FIG. 6 and FIG. 7.

First, the table of image conversion parameters is initialized at S100, and the table of line numbers is initialized at S101. These initializations may be directed by the controller 20 with an image processing command, or done at timing when an image processing operation has been just completed. Next, it is determined whether the image conversion parameter setting section 136 has received a command for changing image conversion parameters at S102. If received, the table of image conversion parameters is updated at S103, the number of required lines is derived at S104, and the table of line numbers is updated at S105. Then, it is determined whether the execution of an image processing operation for one frame of image data has been completed at S106 to prevent the image processing operation from changing to other operations while one frame of the image data is being processed. Another reason for the judgment at S106 is that it is possible to update the tables during the course of the image processing operation, which may reduce overhead time for updating the tables of image conversion parameters. If the operation of one frame has been completed, the image conversion parameters are indicated to the image converting section 134 at S107, and the processing is terminated with indicating the threshold value of the number of lines to the read timing controlling section at S108. On the other hand, if the command for changing image conversion parameters has not been received at S102, it is determined whether only a command for changing required line numbers has been received at S109. If received, the table of line numbers is updated at S105. If the command for changing required line numbers has not been received at S109, the current image processing operation is continued with the previous table without update.

This update method allows updating the tables frame by frame while executing an image processing operation. Also it is possible to update the table of line numbers only.

It is noted that although a command for changing required line numbers is issued by the controller 20, a command for changing image conversion parameters may be issued by, for example, the image conversion parameter sending section 211.

There may be other ways to change parameters in the tables. For example, by setting an "EXECUTE OR NOT" parameter in an entry in the table shown in FIG. 9 to the value of "OFF", it is possible to change other parameters because the image processing operation corresponding to the entry is not executed.

It is also noted that when the present image processing apparatus is used as a video-conference terminal, image data as well as audio data may be transmitted to other image processing apparatus. In this case, it becomes easier to synchronize the image data with the audio data because the present image processing apparatus can reduce delay caused by I/O operations for memory. It is also advantageous in reproducing the image and audio data at the other image processing apparatuses via networks without time-lag.

Second Embodiment

Figure 11:
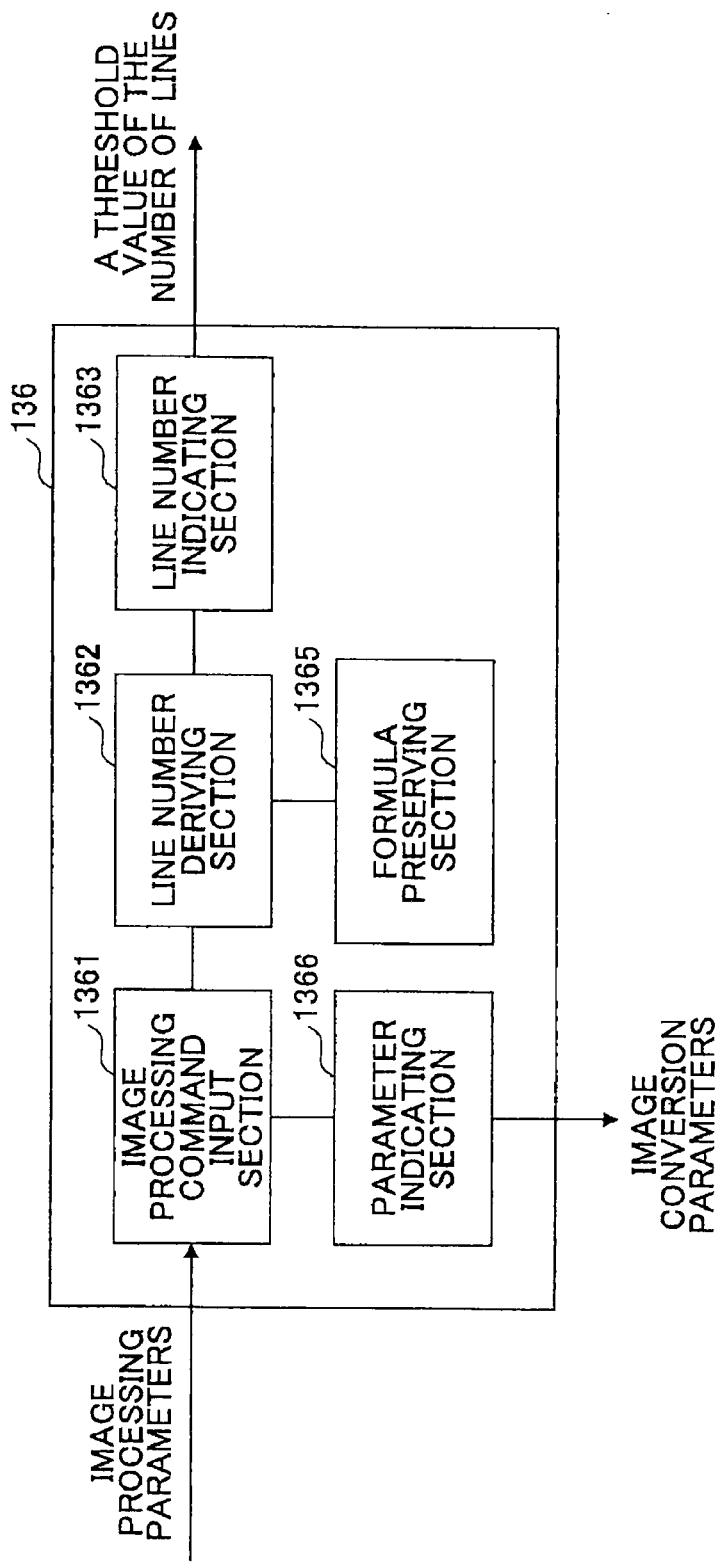
FIG. 11 is a configuration diagram of the image conversion parameter setting section according to a second embodiment.

FIG. 11 is a configuration diagram of an image conversion parameter setting section 136 according to the second embodiment. FIG. 11 differs from FIG. 5 in that instead of the table of line numbers 1364 in FIG. 5, a formula preserving section 1365 is included in FIG. 11.

The formula preserving section 1365 preserves, for example, the following formula, which is utilized for distortion correction.

The number of required lines for distortion correction=correction ratio*200

Although this example illustrates a simple formula, there are cases where the present embodiment has an advantage in deriving the number of required lines. For example, in a case where multiple parameters are related, the size of data in table format may grow too large to refer to. In this case, the present embodiment is advantageous as long as the imaging device 10 has sufficient calculation capability.

While distortion correction is taken as an example for the above explanation, formulas may be provided for other image processing operations.

Also, in a case where multiple types of image processing operations are processed by the image converting section 134 serially in a predetermined order, the number of required lines may be derived at first with the first image processing operation. The second embodiment using the formula preserving section 1365 can cope with a calculation in which, not only the processing order, but also the processing speed, are taken into account.

Further, the present invention is not limited to these embodiments, but various variations and modifications may be made without departing from the scope of the present invention.

For example, in the embodiments, although a terminal device in a video-conference system is used as an image processing apparatus, application of the disclosure should not be considered to be limited to it.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any storage medium for storing processor readable code such as a floppy disk, hard disk, CD ROM, magnetic tape device or solid state memory device.

The hardware platform includes any desired kind of hardware resources including, for example, a central processing unit (CPU), a random access memory (RAM), and a hard disk drive (HDD). The CPU may be implemented by any desired kind of any desired number of processors. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

The present application is based on Japanese Priority Application No. 2011-286611, filed on Dec. 27, 2011, with the Japanese Patent Office, the entire contents of which are hereby incorporated by reference.

What is claimed is:

1. An image processing apparatus comprising:
   an image processing command input section configured to receive, as an input, one or more image processing commands for writing image data into a memory by units of one line;
   a storage section configured to store a table of line numbers in which at least one image processing operation is associated with a number of lines required for performing the at least one image processing operation;
   a line number deriving section configured to derive a maximum number of lines of the image data required to execute an image processing operation when the one or more image processing commands are received by the image processing command input section, the maximum number of lines being based on the one or more image processing commands received by the image processing command input section;
   a line number indicating section configured to output a numerical value indicating the number of lines of the image data derived by the line number deriving section;
   a read timing controlling section configured to control read timing from the memory in response to the numerical value output from the line number indicating section;
   a parameter indicating section configured to output parameters used for the image processing operations based on the image processing commands received by the image processing command input section; and
   an image processing section configured to execute the image processing operations in response to the parameters output from the parameter indicating section.

2. The apparatus as claimed in claim 1,
   wherein the line number deriving section is configured to derive the number of lines of the image data required to execute the image processing operations by referring to the table of line numbers.

3. The apparatus as claimed in claim 2, wherein the image processing command input section is configured to receive a table changing command for changing the table of line numbers, and in response to receiving the table changing command, the image processing command input section updates the table of line numbers to execute the image processing operations.

4. The apparatus as claimed in claim 1, further comprising a formula preserving section configured to preserve a formula used for calculating the number of lines of the image data required to execute the image processing operations,
   wherein the line number deriving section derives the number of lines of the image data required to execute the image processing operations by calculating the number of lines with the formula preserved in the formula preserving section using the parameters indicated by the image processing command input section.

5. The apparatus as claimed in claim 1, further comprising a communication section configured to transmit the image data processed with the image processing operations to another image processing apparatus via a network.

6. The image processing apparatus of claim 1, wherein the storage section is configured to store, in the table of line numbers, a degree of correction in association with the at least one image processing operation, the degree of correction indicating a memory read timing of the image data.

7. An image processing method comprising the steps of:
receiving, as an input, one or more image processing commands for image data written into a memory by units of one line;
storing, in a table of line numbers, at least one image processing operation in association with a number of lines required for performing the at least one image processing operation;
deriving a maximum number of lines of the image data required to execute an image processing operation when the one or more image processing commands are received, the maximum number of lines being based on the received one or more image processing commands;
outputting a numerical value indicating the number of lines of the image data derived by the line number deriving step;
controlling read timings from the memory in response to the numerical value output from the line number indicating step;
indicating parameters used for the image processing operations based on the image processing commands received by the command receiving step; and
executing image processing operations based on the image processing commands received by the command receiving step.

8. The method of claim 7, wherein the storing includes storing, in the table of line numbers, a degree of correction in association with the at least one image processing operation, the degree of correction indicating a memory read timing of the image data.

9. A non-transitory computer-readable recording medium having a program stored therein, which when executed by a processor, configures the processor to:
receive, as an input, one or more image processing commands for image data written into a memory by units of one line;
store, in a table of line numbers, at least one image processing operation in association with a number of lines required for performing the at least one image processing operation;
derive a maximum number of lines of the image data required to execute an image processing operation when the one or more image processing commands are received, the maximum number of lines being based on the received one or more image processing commands;
output a numerical value indicating the number of lines of the image data derived by the line number deriving step;
control read timings from the memory in response to the numerical value output from the line number indicating step;
indicate parameters used for the image processing operations based on the image processing commands received by the command receiving step; and
execute image processing operations based on the image processing commands received by the command receiving step.

* * * * *